Nov. 24, 1953    L. E. IVERSON    2,659,942
WINDSHIELD WARMER
Filed March 25, 1948

Inventor
Lauren E. Iverson
By Robert M. Dunning

Patented Nov. 24, 1953

2,659,942

UNITED STATES PATENT OFFICE 2,659,942

WINDSHIELD WARMER

Lauren E. Iverson, St. Paul, Minn.

Application March 25, 1948, Serial No. 16,992

2 Claims. (Cl. 20—40.5)

My invention relates to an improvement in windshield warmer wherein it is desired to provide a simple and effective apparatus for warming the windshield of a motor vehicle.

Frost shields are often used in colder climates for maintaining the windshields of motor vehicles clear of frost. These frost shields usually comprise a sheet of transparent material secured in spaced relation to the windshield and sealed with respect thereto. While these devices are effective for their intended purpose, certain difficulties are involved. In the first place such frost shields are of little value in keeping the exterior surface of the windshield free of ice and sleet. Secondly when a number of persons enter a cold car, the frost shields often fog temporarily until the interior of the car warms to some extent.

The object of the present invention lies in the provision of a means of confining heated air close to the windshield and to allow constant circulation of this heated air. As a result a structure is provided which acts to heat the windshield and to thus prevent ice and sleet from freezing on the exterior surface thereof.

A feature of the present invention lies in the provision of a means of directing the heated air from the defroster outlets of a car heating system against the windshield and to confine the air adjacent the windshield. By collecting the air and directing it in the manner specified, the air moves over the inner surface of the windshield at a relatively high rate of speed, thus serving to heat the windshield quickly.

A feature of the present invention lies in the provision of a windshield heater comprising a sheet of transparent material having a downwardly inclined flange along its lower edge. This flange extends downwardly and inwardly from the inner surface of the windshield and tends to collect the air directed upwardly from the vehicle defroster. The collected air is directed between the transparent auxiliary pane and the windshield to heat the windshield.

These and other objects and novel features of my invention will be more clearly and fully set forth in the following specification and claims.

In the drawings forming a part of my specification:

The windshield heating device A is designed for use on each windshield panel 10 of a motor vehicle B. Obviously the device may also be applied to any other glass surface equipped with defroster outlets.

The windshield heater A includes a transparent panel 11 formed of transparent plastic, glass or any other suitable material. This panel 11 is preferably flat throughout the major portion of its area, but is bent along a line 12 spaced from the bottom edge thereto to provide a downwardly and inwardly inclined flange 13. This flange 13 inclines downwardly and inwardly from the main portion of the panel to collect air as will be later described.

Figure 1:
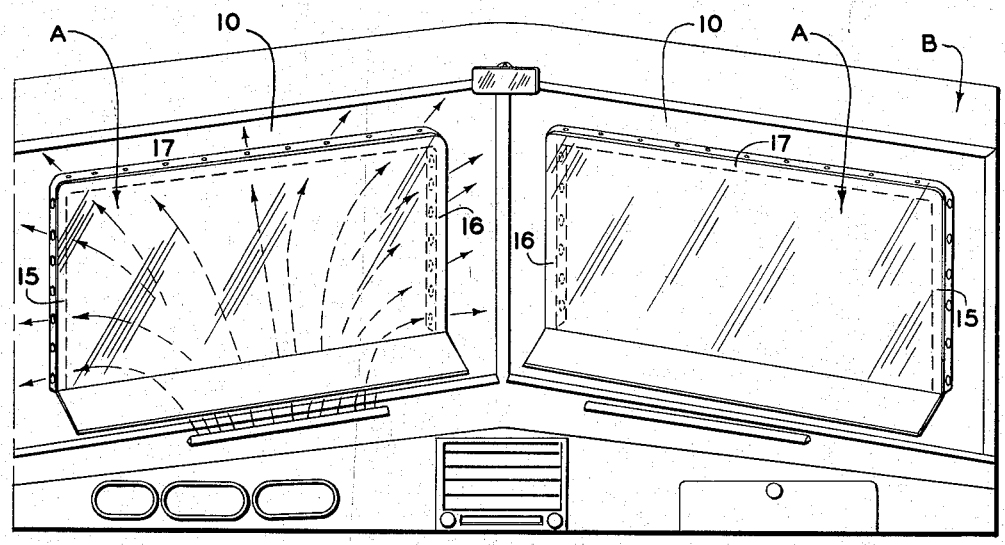
Figure 1 is a diagrammatic view looking toward the inner surface of a vehicle windshield showing my windshield heating means in place thereupon.
Figure 2:
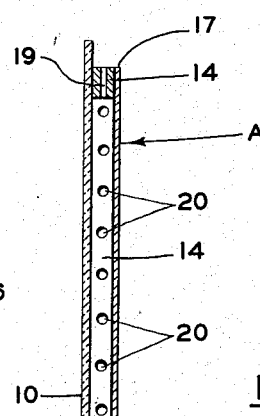
Figure 2 is a sectional view through the windshield heating device.

Means are provided for holding the panel 11 spaced from the windshield 10. A marginal strip 14 of rubber or other suitable cushioning material extends along the side edges 15 and 16 of the panel 11 and along the upper edge 17 thereof. This strip 14 is shown in Figures 1 and 2 of the drawings as having spaced apertures 19 therethrough along the portion of the strip extending across the top edge 17 of the panel. The portions of the strip 14 extending along the side edges 15 and 16 of the panel 11 are also provided with spaced apertures 20, which are preferably somewhat larger than the apertures 19. As a result air is allowed to flow from the space between the panel 11 and the windshield 10, although the flow of air is confined to some extent. The holes 19 in the top portion of the strip allow the air to keep on circulating through the top portion of the shield to provide a continuous air movement along the upper edge of the shield. However, in order to insure circulation of air throughout the entire area of the panel 11, the openings 20 in the side portions of the strip are somewhat larger than the openings 19. In other words, the openings 19 are somewhat restricted to create a lateral flow of air between the panel 11 and the windshield 10 so that the windshield is heated throughout the entire area of the panel 11.

If it is preferred the strip 14 may be discontinuous to produce a similar result. In other words, the strip 14 may be formed in short lengths which are spaced apart to permit a relatively restricted flow through the upper edge of the panel structure. By spacing the short lengths of the strip 14 farther apart along the side edges of the panel 11 the flow of air laterally can be assisted.

Figure 3:
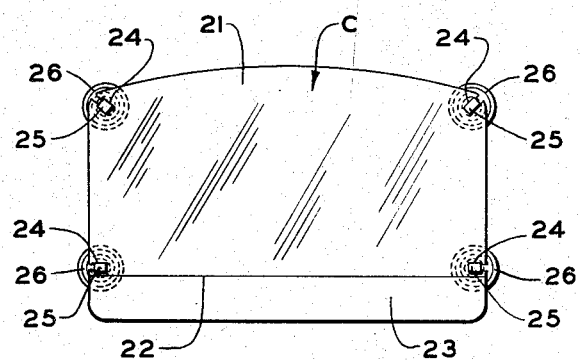
Figure 3 is an elevation view of a modified form of construction.
Figure 4:
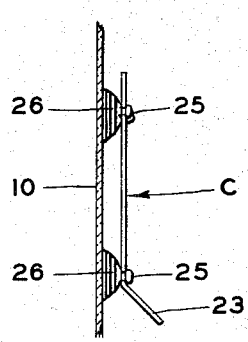
Figure 4 is an end elevation view of the modified form of construction illustrated in Figure 3.

In Figures 3 and 4 of the drawings I disclose a modified form of construction which has certain advantages over the previously described construction and also has certain disadvantages. The windshield heating device C illustrated in these figures includes a transparent panel 21 which is bent along a line 22 spaced from the lower edge of the panels so as to provide a downwardly and inwardly inclined flange 23. This panel 21 is designed for attachment to the windshield 10 of the vehicle B much in the manner previously described in conjunction with the heating device A, and in the same location. However, in place of the tape 14 which must be adhered or cemented both to the windshield 10 and to the panel 11, I provide suction cups for holding the device C in place. This suction cup structure has the disadvantage that it does not restrict the flow of air at the top of the auxiliary panel. On the other hand, it has the advantage of being easy to attach and quickly removable when it is not required. In other words, the device C may be quickly attached in any time during cold weather and may be taken off to provide clearer vision during warmer weather.

As illustrated in Figure 3 of the drawings a series of peripherally spaced slots 24 are provided about the edge of the panel 21, two such slots being shown near the bend line 22 and a second pair of slots being shown near the upper edge of the panel 21. These slots slidably support knobs 25 mounted upon suction cups such as 26. These suction cups 26 may be of any suitable shape or design and the knobs 25 are mounted centrally thereof on the back side of the same for engagement with the panel 21. The knobs hold the panel in fixed relation and when the suction cups are secured to the inner surface of the windshield the panel 21 is held in spaced relation thereto.

It will be noted that the windshield heating device C has a flange 23 similar to the flange 13 of the heating device A. The flange 23 is designed to extend over the defroster outlet 27 and to collect air being emitted therefrom. This heated air collected by the flange 23 is guided into the space between the panel 21 and the windshield and therefore acts to heat the windshield more quickly and more effectively than would otherwise be the case.

In accordance with the patent statutes, I have described the principles of construction and operation of my windshield warmer, and while I have endeavored to set forth the best embodiments thereof, I desire to have it understood that obvious changes may be made within the scope of the following claims without departing from the spirit of my invention.

I claim:

1. In combination with a permanently installed vehicle windshield defrosting system having an elongated slot for directing warmed air against the windshield, the combination including an auxiliary attachment for confining the warm air in close adjacency to the windshield, said attachment comprising a panel of transparent material equipped with an integral flange inclining downwardly and outwardly from the lower edge of said panel, said flange being at least as long as said slot, and means for detachably holding said panel in a slightly spaced relation from said windshield with said flange overhanging said slot.

2. In combination with a permanently installed vehicle windshield defrosting system having an elongated slot for directing warmed air against the windshield, the combination including an auxiliary attachment for confining the warm air to close adjacency to the windshield, said attachment comprising a panel of transparent material equipped with an integral flange inclining downwardly and outwardly from the lower edge of the panel, said flange extending substantially the full width of said panel, and means for detachably holding said panel in a slightly spaced relation from said windshield with said flange overhanging said slot.

LAUREN E. IVERSON.

References Cited in the file of this patent

UNITED STATES PATENTS

| Number | Name | Date |
| --- | --- | --- |
| 507,731 | Horne | Oct. 31, 1893 |
| 1,630,208 | Norbeck | May 24, 1927 |
| 1,741,058 | Isaak | Dec. 24, 1929 |
| 1,777,435 | Hogelund | Oct. 7, 1930 |
| 1,790,419 | Heinemann et al. | Jan. 27, 1931 |
| 2,032,998 | Mickadeit | Mar. 3, 1936 |
| 2,189,465 | Haley et al. | Feb. 6, 1940 |

FOREIGN PATENTS

| Number | Country | Date |
| --- | --- | --- |
| 161,458 | Switzerland | July 1, 1933 |
| 436,360 | Great Britain | Oct. 9, 1935 |
| 638,408 | Germany | Nov. 14, 1936 |